(12) United States Patent
Nijim et al.

(10) Patent No.: US 11,902,602 B1
(45) Date of Patent: Feb. 13, 2024

(54) COMBINING VIDEO CONTENT FEEDS

(71) Applicant: Cox Communications, Inc., Atlanta, GA (US)

(72) Inventors: Yousef Wasef Nijim, Cumming, GA (US); James Alan Strothmann, Johns Creek, GA (US); Michael Paul Overcash, Duluth, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 101 days.

(21) Appl. No.: 16/807,962

(22) Filed: Mar. 3, 2020

(51) Int. Cl.
  *H04N 21/236* (2011.01)
  *G06F 16/735* (2019.01)
  *G06F 16/783* (2019.01)
  *H04N 21/2365* (2011.01)

(52) U.S. Cl.
  CPC ..... *H04N 21/23614* (2013.01); *G06F 16/735* (2019.01); *G06F 16/7844* (2019.01); *H04N 21/2365* (2013.01)

(58) Field of Classification Search
  CPC .......... H04N 21/23614; H04N 21/2365; G06F 16/735; G06F 16/7844
  See application file for complete search history.

(56) References Cited

U.S. PATENT DOCUMENTS

| | | | |
|---|---|---|---|
| 7,134,133 B1 * | 11/2006 | Wugofski | H04N 21/47 725/39 |
| 8,930,999 B1 * | 1/2015 | Maeng | H04N 21/4347 725/41 |
| 9,800,933 B1 * | 10/2017 | Strothmann | H04N 5/445 |
| 9,980,007 B1 * | 5/2018 | Thompson | H04N 21/482 |
| 2005/0036068 A1 * | 2/2005 | Shin | H04N 21/84 348/588 |
| 2015/0082352 A1 * | 3/2015 | Cloutier | H04N 21/4826 725/46 |
| 2018/0254920 A1 * | 9/2018 | Shaw | H04L 12/4641 |

OTHER PUBLICATIONS

Jared Newman, How to get a single channel guide for both over-the-air and streaming TV, TechHive, Aug. 1, 2019, 9 pages.

* cited by examiner

*Primary Examiner* — Oschta I Montoya
(74) *Attorney, Agent, or Firm* — Merchant & Gould P.C.

(57) ABSTRACT

Combining a plurality of video feeds of various modulation formats and from a variety of sources for providing a unified interface and an extension of services across the plurality of video feeds is provided. An integrated video feed system located at least in part at a subscriber premises is configured to receive a plurality of video content broadcast feeds (e.g., cable television, over the air television, satellite television, Internet Protocol television), generate a combined data feed comprising video content signals included in the plurality of video content feeds, identify and decode the video content signals, obtain additional data associated with each of the plurality of video content feeds, provide a unified interface for displaying an aggregation of data and services associated with the plurality of video content feeds, and to provide requested video content included in the plurality of video content broadcast feeds for playback on a display device.

20 Claims, 7 Drawing Sheets

COMBINING VIDEO CONTENT FEEDS

BACKGROUND

Cable television subscribers may subscribe to and/or consume video content services from a variety of sources. For example, in addition to receiving cable television content and services from a cable services provider delivered via a hybrid fiber-coaxial (HFC) network, a subscriber may also receive video content and services from other sources, such as satellite television content from a satellite television service provider transmitted via a communications satellite, IPTV (Internet Protocol Television) video content delivered over the Internet, and local television (OTA (Over-The-Air)) content transmitted by a local broadcaster via radio waves.

While having access to various video content feeds may provide a subscriber with access to a greater amount and wider variety of content and services, current technologies are limited to providing these various feeds as separate services. For example, in some cases, accessing and processing certain types of video content signals may require the use of specialized equipment and/or different service providers. In other cases, an end device may be configured to receive different video content feeds from a plurality of sources; however, current technologies may be limited to the processing and presentation of a single feed at a time. Accordingly, to consume video content or services provided by various providers, the subscriber may be required to switch between inputs or applications. As can be appreciated, having to switch between inputs or applications to consume content from disparate sources can be considered a discontinuous user experience that may not only be inefficient, but may also be frustrating to the subscriber. Additionally, providing the various feeds as separate services may not allow for providing a common electronic programming guide interface to display programs offered by a plurality of video content providers, or for recommendations, favorites, recordings, etc., across the various feeds to be provided in a common interface.

Due to the above-described deficiencies and limitations of disparate video content consumption, an alternative technical solution is needed to provide an integration of disparate video content feeds for enabling access to content and services provided by various sources using a single interface.

SUMMARY

Aspects of the present disclosure provide a system, method, and computer readable storage device for combining a plurality of video feeds of various modulation formats and from a variety of sources for providing a unified interface and an extension of services across the plurality of video feeds. The system may include a multiplexer configured to receive the plurality of video content feeds, demodulate video content feeds based on a feed type, combine the plurality of video content feeds, and transmit the combined video content feed to a set top box. The set top box may be configured to receive the combined video content feed, identify and decode the video content signals, obtain additional data associated with each of the plurality of video content feeds, provide a unified interface for displaying an aggregation of data and services associated with the plurality of video content feeds, and to provide requested video content included in the plurality of video content broadcast feeds for playback on a display device. Moreover, aspects provide an integration of the various services (e.g., recommendations, favorites, recording, closed captioning, parental controls) through a service provider as part of offering services delivered over a plurality of delivery networks.

The unified interface may include an aggregated electronic programming guide that enables users to easily navigate available content across the plurality of video feeds without having to switch between applications or inputs. The aggregated electronic programming guide may further include recommendations, favorites, and recordings across the plurality of video feeds. A customization engine may additionally be provided for overriding an existing channel or a channel request based on user preferences and/or business rules. For example, the customization engine may select a video feed that has a more reliable higher quality video signal, select an RF-delivered video feed to reduce bandwidth allocations over an IP-delivery network, select a video feed based on available interactive services associated with the video feed, etc.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
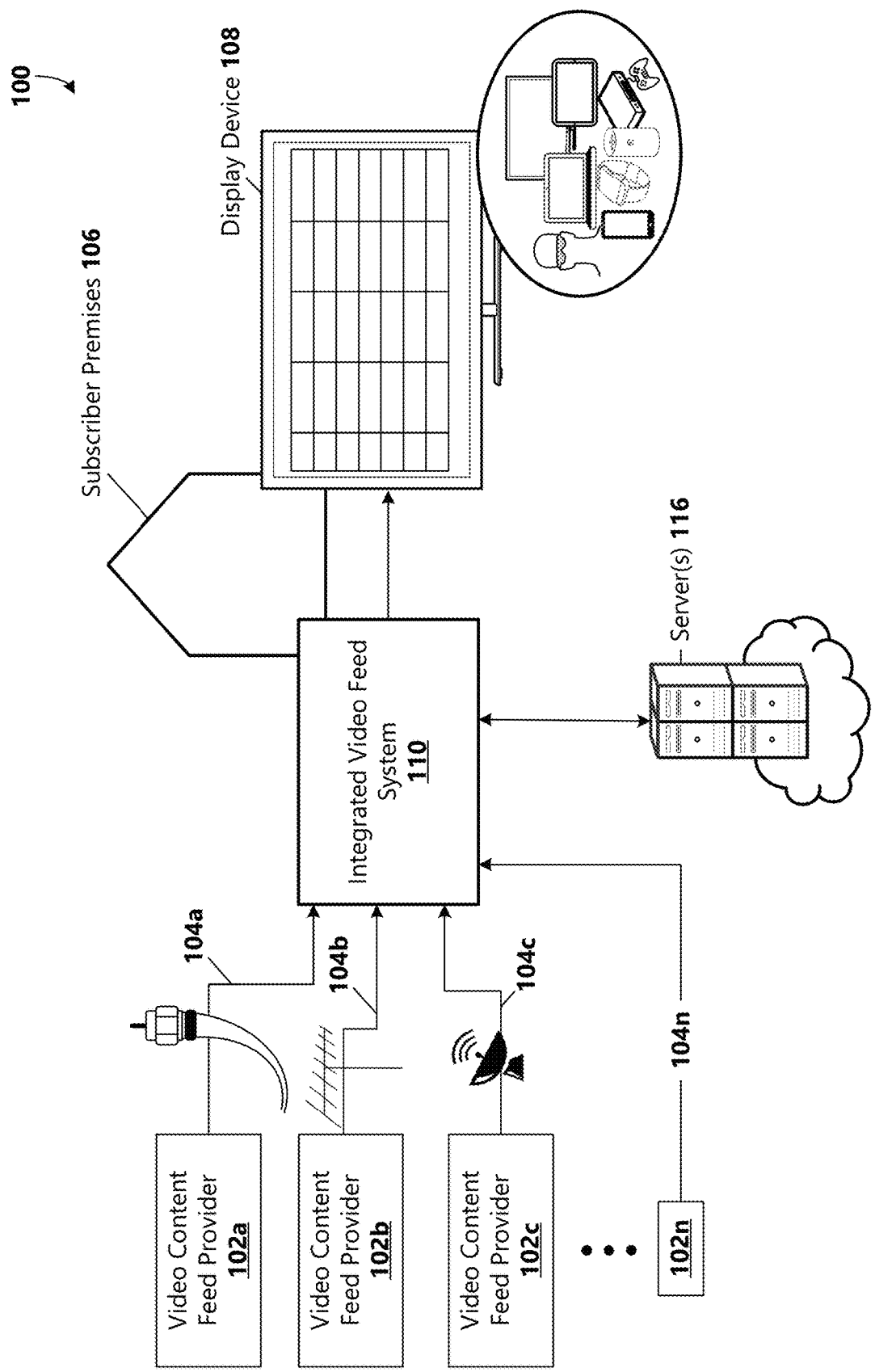
FIG. 1 is a block diagram of an example environment in which a system of the present disclosure can be implemented.

Aspects of the present disclosure enable combining a plurality of video feeds of various modulation formats and from a variety of sources for providing a unified interface and an extension of services across the plurality of video feeds. FIG. 1 is a block diagram of an example environment 100 in which a system of the present disclosure can be implemented. A plurality of video content feed providers 102a-n (generally 102) may provide video content broadcasts to a subscriber over a variety of networks 104a-n (generally 104). For example, the video content feed providers 102 may encode and modulate video content/programming data (e.g., video data, audio data, metadata) and services onto radio frequency (RF) carriers and combine the RF carriers into an electrical signal that is transmitted over a network 104 to a subscriber premises 106. According to an aspect, the video content feeds may be encoded and transmitted according to various modulation techniques, such as quadrature amplitude modulation (QAM), advanced television standards committee (ATSC) standards, etc. In some examples, a video content feed may include internet protocol television (IPTV) content that may be communicated by one or more networks 104 using Data over Cable Service Interface Specification (DOCSIS) standards, Passive Optical Network (PON) standards, etc. As an example, a first video content feed provider 102a may include a cable television (CATV) service provider configured to transmit a video content broadcast comprising QAM channels over a hybrid fiber coax (HFC) transmission network 104a to a subscriber premises 106. As another example, a second video content feed provider 102b may include a terrestrial television broadcaster configured to transmit another video content broadcast comprising ATSC channels over the air (OTA) 104b that are received by an antenna at the subscriber premises 106. As another example, a third video content feed provider 102c may include a satellite service provider configured to transmit satellite broadcast channels via a communications satellite that are received by a satellite antenna at the subscriber premises 106. As another example, a fourth video content feed provider 102d may include an IPTV service provider configured to transmit IPTV channels via a broadband network 104d using the Internet Protocol.

According to an aspect, the environment 100 may include an integrated video feed system 110 located at least in part at the subscriber premises 106 that is configured to receive a plurality of video content broadcast feeds, generate a combined data feed comprising video content signals included in the plurality of video content feeds, identify and decode the video content signals, obtain additional data associated with each of the plurality of video content feeds, provide a unified interface for displaying an aggregation of data and services (e.g., recommendations, favorites, recording, closed captioning, parental controls) associated with the plurality of video content feeds, and to provide requested video content included in the plurality of video content broadcast feeds for playback on a display device 108. For example, the integrated video feed system 110 may be operatively connected to a local network at the premises 106, where video programming content provided by the plurality of video content feed providers 102 may be delivered to television sets, computers, gaming devices, and other devices that may include or be operatively connected to the display device 108.

In some examples, the integrated video feed system 110 may be configured to communicate with one or more servers 116 to obtain channel lineups/schedules and other information corresponding to the video content channels offered by the plurality of video content feed providers 102 and provide an aggregated or collective electronic program guide (EPG) for display on the operatively connected display device 108. The aggregated/collective EPG may include scheduling information of each of the video content channels provided by the plurality of video content feed providers 102, and may further include information (e.g., descriptions, ratings) about the various programs included in the lineups/schedules. In some examples, the aggregated/collective EPG may include signal quality information.

In some examples, the integrated video feed system 110 is configured to extend one or more services (e.g., content recording, recommendations, favorites, user preferences, business rules, closed captioning, parental controls) across the plurality of video content feeds. In some examples, a first video content feed may not include a particular service offered by a second video content feed provider. By combining the video content feeds, aspects may advantageously extend the service offered by the second video content feed provider to the first video content feed. As an example, recording functionalities may be provided for video content included in any of the plurality of video content feeds. By providing a combined video content feed, the integrated video feed system 110 may enable a local or cloud-based digital video recorder (DVR) to record a video program included in one of the plurality of video content feeds provided by the various video content feed providers 102. In some examples, the DVR may be configured to record more than one video program included in the plurality of video content feeds at a time.

In some examples, the EPG may include a menu option for providing a listing of integrated recommendations, wherein the integrated recommendations may include a listing of recommended channels or video programs included in the plurality of video content feeds based on specified and/or determined user preferences. For example, user preferences may be determined based on a user's viewing history of video programs included in one or more of the plurality of video content feeds, and the recommended channels or video programs may be based on matching the user preferences to one or more channels or programs included in the plurality of video content feeds. That is, a recommendation may include a recommended video program provided in a first data feed from a first video content feed provider 102a based on the user's viewing history of another video program provided in a second video content feed from a second video content feed provider 102b. This may advantageously use the user's combined viewing histories to provide better/more relevant recommendations and to provide a single easily-navigable interface to view recommendations across all the available video content feeds. As another example, the EPG may include a menu option for providing a listing of favorites, which may comprise one or more video channels or video programs that are selected as favorites by the user or determined to be favorites based on the user's viewing history. The listing of favorites may be configured to include, in a single easily-navigable interface, favorite channels or programs across the plurality of video content feeds. Other extended services for the plurality of video content feeds may be additionally or alternatively provided.

Each component in the example network environment 100 may include one or more computing devices such as servers, workstations, set top boxes, desktop computers, laptop computers, tablets, mobile phones, smart devices, gaming devices, etc., and one or more databases. Further details of the computing devices and variations thereof can be found in FIGS. 5, 6A, 6B, and 7.

Figure 2:
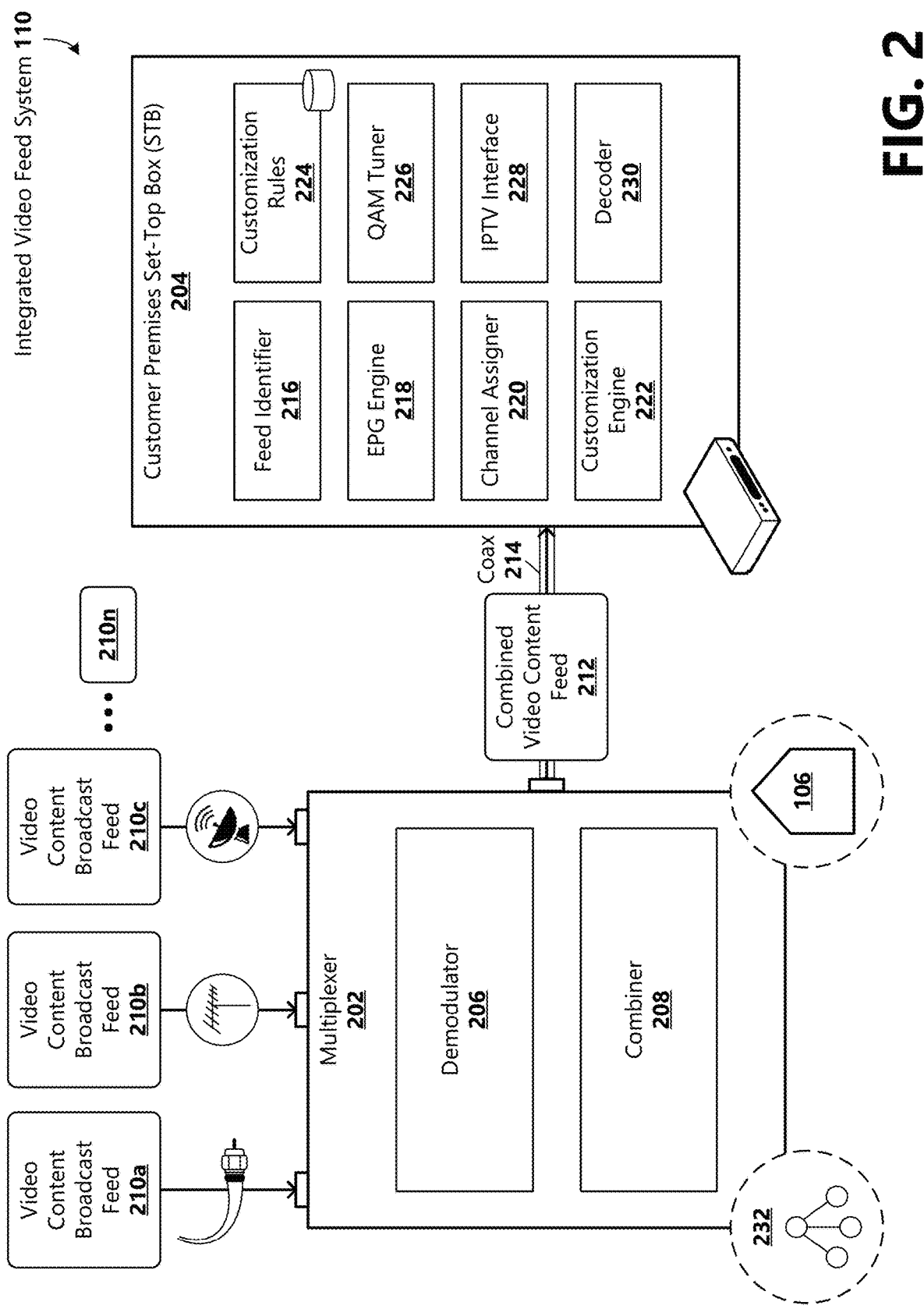
FIG. 2 is a block diagram showing components of an example integrated video feed system according to an embodiment.

With reference now to FIG. 2, a conceptual illustration of an example embodiment of the integrated video feed system 110 is provided. As should be understood by those skilled in the art, one or more of the components included in the integrated video feed system 110 can be integrated or provided in any combination of separate systems, wherein FIG. 2 shows only one example. According to an aspect, the integrated video feed system 110 may include a multiplexer 202 operative or configured to receive a plurality of video content broadcast feeds 210a-n (generally 210 and sometimes referred to herein as video content feeds) from a plurality of video content feed providers 102, to generate a combined video content feed 212 comprising video data, audio data, and any related data (e.g., control information) corresponding to channels within each of the associated video content broadcast feeds 210, and to provide the combined video content feed 212 as output to a set-top box (STB) 204 located at the customer premises.

According to an aspect, the multiplexer 202 may comprise a plurality of input pins operatively connected to the various transmission networks 104, wherein the plurality of input pins and/or fiber terminals are configured to receive the plurality of video content feeds 210 transmitted to the subscriber premises 106 via the various transmission networks 104. For example, each of the plurality of video content feeds 210 may correspond to different carrier signals that carry video data, audio data, and related data (e.g., control information) corresponding to channels within the video content broadcast feed provided by a video content feed provider 102. The multiplexer 202 may further comprise an output pin and/or fiber terminal operatively connected to the STB 204, wherein the output pin is configured to output the combined video content feed 212 to the STB 204 via a transmission line. In some examples, the multiplexer 202 may be connected to the STB 204 via a conveying medium, such as a coaxial cable line 214.

According to an aspect, the multiplexer 202 may comprise a demodulator 206 operative or configured to extract, from a video content broadcast feed 210, video content/programming data (e.g., video data, audio data, metadata) from the carrier signals that are used to transport the video content through a transmission network 104. For example, depending on the type of video content broadcast feed 210 (e.g., a satellite broadcast feed or OTA feed), the demodulator 206 may demodulate the feed for allowing the video content data signals to be combined with video content data signals included in other received video content broadcast feeds (e.g., a CATV QAM feed, an IPTV feed). When the extracted video content signals are transmitted to and processed by the STB 204, images corresponding to the video content signals may be displayed on a display device 108 operatively connected to the STB 204 and audio corresponding to the video content signals may be played by a speaker included in or operatively connected to the a display device 108 or STB 204.

According to another aspect, the multiplexer 202 further comprises a combiner 208 operative or configured to receive the extracted video content signal from the demodulator 206 and combine the video content signals carried in each of the plurality of video data broadcast feeds 210 into a combined video content feed 212 that is transmitted to the STB 204. For example, the combiner 208 may be configured to combine the various frequency bands of the plurality of video data broadcast feeds 210 into a combined signal that is transmitted to the STB 204 via a conveying medium, such as coaxial cable 214. In some cases, different received signals may use and overlap a same frequency band. Accordingly, in some examples, the combiner 208 may be configured to select a 'better' signal based on the signal-to-noise ratio (SNR) of the received signals; or, in other examples, the combiner 208 may include a modulator configured to move one of the overlapping signals to another frequency band. In some examples, the combiner 208 may be configured to store or access customer behavior data that enables the combiner to determine, based on past customer behavior, a preferred signal; wherein the modulator may move the other signal to another frequency band. Any frequency band changes may be communicated to the EPG engine 218 (described below). In an alternative embodiment, the demodulator 206 may include a plurality of demodulators, the STB 204 may include a plurality of decoders 230, and the resulting AV stream from the multiplexer 202 may be delivered to the STB based on digital switching. In another alternative embodiment, the multiplexer 202 may include an analog switch configured to switch between video content broadcast feeds 210 such that only one input is connected to the demodulator 206 at a time.

The STB 204 is illustrative of a computing device having at least one processor, memory, and an input/output mechanism. According to an aspect, the STB 204 is configured to receive the combined video content feed signal 212 output by the multiplexer 202 and received via the coaxial cable 214, and to convert video content signals included in the combined video content feed 212 into a form that can be displayed on a television screen or other display device 108.

According to an aspect, the STB 204 may comprise a feed identifier 216 illustrative of a software application, module, or computing device operative or configured to parse the combined video content feed 212 to identify the various video content data signals within the received combined video content feed 212. For example, the feed identifier 216 may be operative to determine the types of feeds and frequency modulation techniques that are associated with each of the plurality of video content broadcast feeds 210 included in the combined video content feed 212. For example, the determination may be made based on one or more of: metadata provided by the multiplexer 202, the frequency bands used, additional information passed through the multiplexer 202 from the video content broadcast feeds 110, and service provider (i.e., video content feed provider 102) channel information that may be stored on a server 116 and accessed by the feed identifier 216.

According to an aspect, the STB 204 further comprises an electronic programming guide (EPG) engine 218 illustrative of a software application, module, or computing device operative or configured to, based on each of the determined types of video content broadcast feeds 210 included in the combined video content feed 212 (e.g., as determined by the feed identifier 216), request programming guide data and metadata from one or more data source servers 116. For example, the programming guide data may comprise information about the video content channels included in the video content broadcast feeds 210, such as channel numbering, frequencies of the channels, and associated metadata. The one or more data source servers 116 may be or be associated with each of the one or more video content feed providers 102, or may be a centralized scheduling information provider that receives programming scheduling information from each of the one or more video content feed providers 102 and provides programming scheduling information associated with the one or more video content feed providers 102 to a requestor (e.g., the EPG engine 218 of the integrated video feed system 110).

According to an aspect, the EPG engine 218 is further operative or configured to generate an EPG for display on a television screen or other display device 108. For example, the EPG may include a menu of programming scheduling information corresponding to the plurality of video content broadcast feeds 210 included in the combined video content feed 212. That is, the EPG may provide a unified interface for displaying an aggregation of data associated with the plurality of video content broadcast feeds 210. In various examples, the EPG is an interactive EPG. For example, the EPG may be configured to enable a user to navigate scheduling information menus interactively, which may include selecting and discovering programming content by time, title, channel, or genre using an input device such as a keypad, computer keyboard, or television or STB remote control.

In some examples, the EPG may further include a recommendations menu that provides a common user interface for listing and enabling interaction with recommendations across the plurality of video content broadcast feeds 210. The EPG engine 218 may be further operative or configured to include, in the recommendations menu, at least one recommendation including a recommended video content program or channel included in the plurality of video content broadcast feeds 210. For example, the recommendation may be based on explicitly and/or implicitly defined user preferences, and may include content provided by any of the plurality of video content feed providers 102. Implicitly defined user preferences may be determined based on the user's viewing history across the plurality of video content broadcast feeds 210. By using the collective histories of the user's viewing behaviors, the recommendations determined for the user may be more relevant to him/her based on the user's collective viewing habits.

In some examples, the EPG may further include a favorites menu, wherein the EPG engine 218 may be further operative or configured to include, in the favorites menu, at least one video content program or channel that is explicitly selected as a favorite by the user or implicitly selected based on the user's viewing history. The favorites menu may include programs or channels provided by the plurality of video content feed providers 102. As with the recommendations menu, the favorites menu provides a common user interface for listing and enabling interaction with favorites across the plurality of video content broadcast feeds 210. In some examples, the EPG engine 218 may be further configured to apply one or more business rules when selecting favorite content items or recommended content items. The one or more business rules may be configured to select a content item for inclusion in the favorites menu or recommendations menu based on resolution, bitrate, bandwidth allocation, etc. For example, if a content item is provided by two sources, and if the content item provided by one source is 4K and the content item provided by the other source is 1080p30, then a business rule may be applied that automatically selects the 4K content item to include in the favorites or recommendations menu. As another example, if the resolutions are the same, a business rule may be applied that automatically selects the content item with a higher bitrate to accommodate higher image quality in the video output. The business rules may be configurable and may include additional or alternative types of business rules.

In some examples, the STB 204 further comprises or is operatively connected to a channel assigner 220 illustrative of a software application, module, or computing device operative or configured to assign channel numbers to channel frequencies used by the video content feed providers 102 to broadcast their video content broadcast feed 210. In some examples, the channel assigner 220 may be operative or configured to assign virtual channel numbers. For example, virtual channel numbers that are assigned to the various channel frequencies may be displayed in the EPG corresponding to the channel frequency and programming content broadcast on that frequency. Accordingly, if a same channel number is assigned by more than one video content feed provider 210 to more than one channel frequency used to broadcast the signals, one or more virtual channel numbers may be assigned to the signals and may override the provider-assigned channel numbers. The virtual channel numbers assigned by the channel assigner 220 may be provided to the EPG engine 218 for inclusion in the aggregated EPG.

In some examples, the STB 204 may further comprise or be operatively connected to a customization engine 222 illustrative of a software application, module, or computing device operative or configured to apply one or more customization rules 224 (e.g., stored in a local or cloud-based rules data store) as part of selecting content for inclusion or preferential/prominent display in the EPG, assigning virtual channel numbers, and/or requesting a channel corresponding to a user selection. For example, based one or more customization rules 224, the customization engine 222 may determine to give preference to one particular video content signal over another. For example, the customization engine 222 may be configured to give preference to a video content feed with a better signal and that may provide a higher video quality resolution bit rate. Or as another example, the customization engine 222 may be configured to give preference to a video content feed that conserves bandwidth in an IP-delivery network.

In some examples, as part of giving preference to a particular video content signal over another, the customization engine 222 may assign or instruct the channel assigner 220 to assign a virtual channel number to the preferred video content signal, while suppressing the other (not-preferred) video content signal. In other examples, the customization engine 222 may be configured to apply customization rules 224 after a selection to view a certain video content program. For example, the user may select to view a first video content program provided by a first video content broadcast feed 210a, and if the customization engine 222 makes a determination to give preference to another broadcast of the video content program, the customization engine 222 may be operative or configured to instruct the multiplexer 202 to send the preferred video content broadcast feed instead of the selected first video content broadcast feed 210a.

The one or more customization rules 224 may include business rules and/or user preference rules. The user preference rules may be explicitly defined (e.g., the user selects certain channels or content preferences) or implicitly defined (e.g., the user's channel or content preferences are determined based on the user's historical usage patterns). The business rules may correspond to quality of service rules. As an example, given two different video content signals that may include the same or similar video programming content, the customization engine 222 may give preference to one video content signal over the other based on the quality or strength of the signal, higher bitrate, higher resolution, if a feed utilizes less bandwidth, power, or memory, etc. As another example, the customization engine 222 may give preference to one video content signal over another based on additional services that may be provided with the video content signal. For example, the preferred video content signal may include interactive functionalities that the other video content signal may not include. Examples of interactive functionalities may include, but are not limited to: selectable hotspots that reveal other content or link to a web page, customizable views that allow the user to drag the screen within a video frame, branches that allow the user to control storylines and/or customize the content they see, data inputs for enabling user input, quizzes or other gaming functionalities, and other interactive functionalities.

In some examples, the customization engine 222 may be operative or configured to give preference to certain data (e.g., audio data or video data) in one video content signal over certain data in another video content signal. For example based on one or more customization rules 224, the audio data of a first video content signal associated with particular video programming may be preferred and assigned a virtual channel number, and the video data of a second video content signal associated with the same or similar video programming may be preferred and assigned the same virtual channel number such that tuning to the virtual channel number may include tuning to two different video content feeds and filtering out a particular signal (e.g., video or audio) of each feed, and thus provide a combination of the video and audio data of the two signals. As can be appreciated, that may enable the user to watch video of the second video content broadcast feed 210 while listening to audio of the first video content broadcast feed 210.

In some examples, the EPG engine 218 is operative or configured to interface a local or cloud digital video recorder (DVR). For example, the user may be enabled to select a video content program included in the EPG to record and view at a later time. Additionally, recorded content from any of the video content feed providers 102 may be included in a common recordings menu user interface. For example, video content programming that is provided by one or more of the plurality of video content feed providers 102 and recorded may be listed in an integrated user interface of the EPG that includes a listing of recorded content.

According to another aspect, the feed identifier 216 may be further configured to split the combined video content feed 212 and deliver particular video content signals to one of: a QAM tuner 226, or an IPTV interface 228, then to a decoder 230 based on the type of signal. For example, based on a selection of a particular channel included in the combined video content feed 212, a signal may be passed to the multiplexer 202 to pass the corresponding video content signals to the STB 204. If a recording is occurring, the multiplexer 202 may be configured to allow for the signal associated with the recording and an additional video content signal to pass through to the STB 204. If the video content signals are QAM signals, the QAM signals may be passed to the QAM tuner 226 to be processed. For example, the QAM tuner 226 may tune to a requested QAM channel. In some examples, the QAM tuner 226 may be further operative or configured to enable various entitlements based on the user's subscription (e.g., with the CATV service provider). The IPTV interface 228 may be operative or configured to receive and decrypt IPTV video content signals according to appropriate IPTV protocols, and then pass the decrypted IPTV packets to the decoder 230 for processing. In some examples, if the video content signals are ATSC signals, the ATSC signals may be passed directly to the decoder 230 for processing. According to an aspect, the decoder 230 may be operative or configured to decode the received video content signals for the selected channel and convert the channel signal into a format that can be processed by the display device 108 (and/or speaker device) to properly output the video content to be displayed and audibly played. The decoder 230 may be further include or be operatively connected to a decryptor configured to decrypt encrypted signals. The decrypted signals may then be passed to the display device 108.

According to another embodiment of the integrated video feed system 110, in some examples, the multiplexer 202 may be located at a node 232 in a transmission network 104. For example, an HFC transmission network 104a may extend from a head end of a CATV service provider (first video data feed provider 102a) to the node 232, where the node 232 may serve a plurality of subscribers in a service area. When the multiplexer 202 is located at a node 232, video content broadcast feeds 210 may be passed from the subscriber premises 106 upstream to the multiplexer 202, and the combined video content feed 212 may be passed to the customer premises STB 204 via a transmission medium, such as a coaxial cable 214 or other transmission media.

Figure 3A:
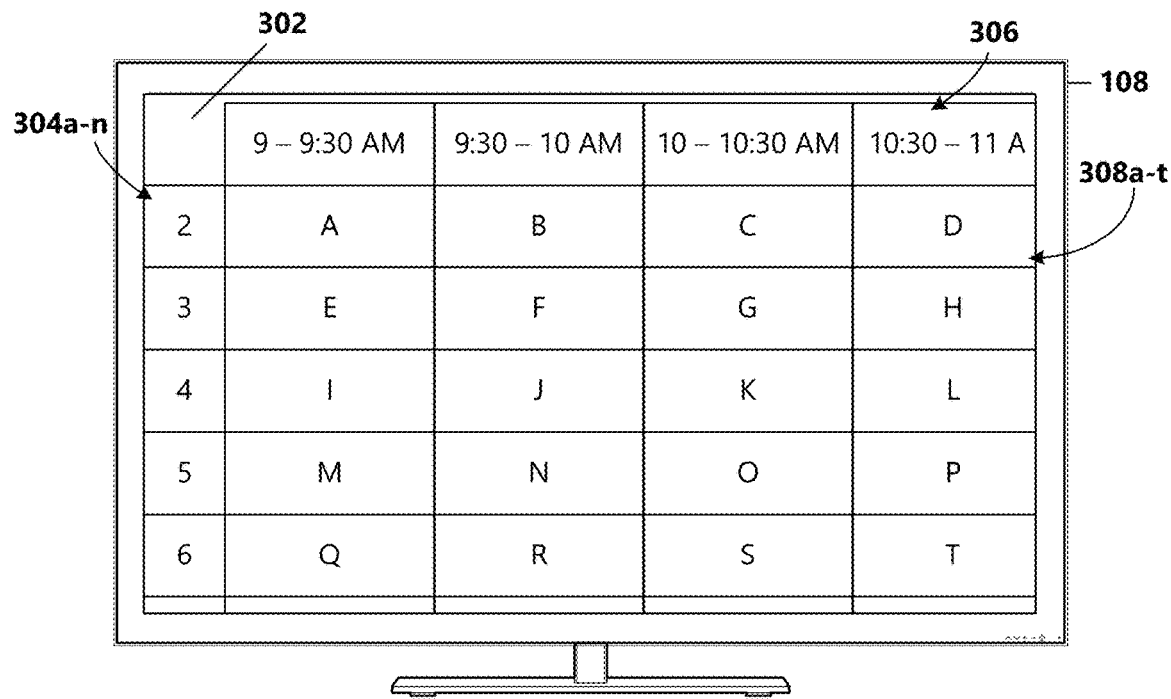
FIG. 3A is an illustration of an example electronic programming guide including a collective listing of video content programs available to the subscriber from a plurality of video content feed providers.

With reference now to FIG. 3A, an example EPG 302 is illustrated that provides, in a user interface, a collective listing of video content programs 308a-t (generally 308) available to the subscriber from a plurality of video content feed providers 102. In some examples, the listing of video content programs 308 may be categorized by channel 304 or content feed provider. The channels 304 may include actual channel numbers (e.g., assigned by the video content feed providers 102) and/or virtual channel numbers (e.g., channel numbers assigned by the STB 204). In other examples, the listing of video content programs 308 may be categorized by genre or other category type. In some examples, the EPG 302 may include additional information, such as the video content feed provider 102 from where the channel is derived.

According to an aspect, one or more of the video content programs 308 included in the EPG 302 may be selected for inclusion or selected for preferential or prominent display in the EPG 302 based on customization rules 224. For example, based on one or more customization rules 224 corresponding to user preferences and/or business rules (e.g., signal quality, signal strength, bandwidth usage) the customization engine 222 may determine that one video content program 308 may be more preferred than another video content program; and based on this determination, the more preferred video content program 308 may be displayed more prominently (e.g., position, size, effects, description) in the EPG 302 that the other video content program.

Figure 3B:
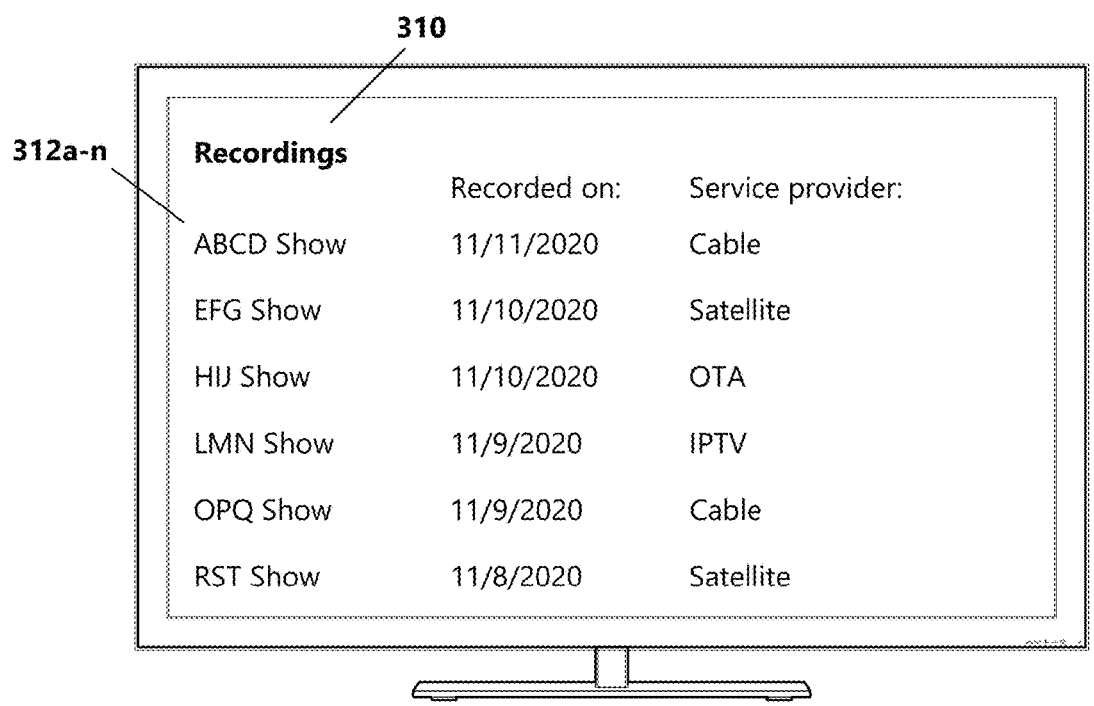
FIG. 3B is an illustration of an example recommendation menu including a collective listing of recorded video content programs from a plurality of video content feed providers.

With reference now to FIG. 3B, an example recordings menu 310 is illustrated that provides, in a single user interface, a collective listing of recorded programs 312a-n (generally 312). For example, the recorded programs 312 may include programs broadcast by more than one of the plurality of video content feed providers 102. In some examples, a particular video content program 308 may be selected to be recorded based on one or more customization rules 224. That is, for example, the user may select to record a first video content program 308a. Based on one or more customization rules 224 corresponding to user preferences and/or business rules, the customization engine 222 may determine that a second video content program 308b may be more preferred than first video content program 308a; and based on this determination, the more preferred video content program 308b may be recorded. As described above, preference may be given based on quality of service (e.g., signal quality, signal strength, bandwidth usage), user preferences, additional services, etc.

Figure 4:
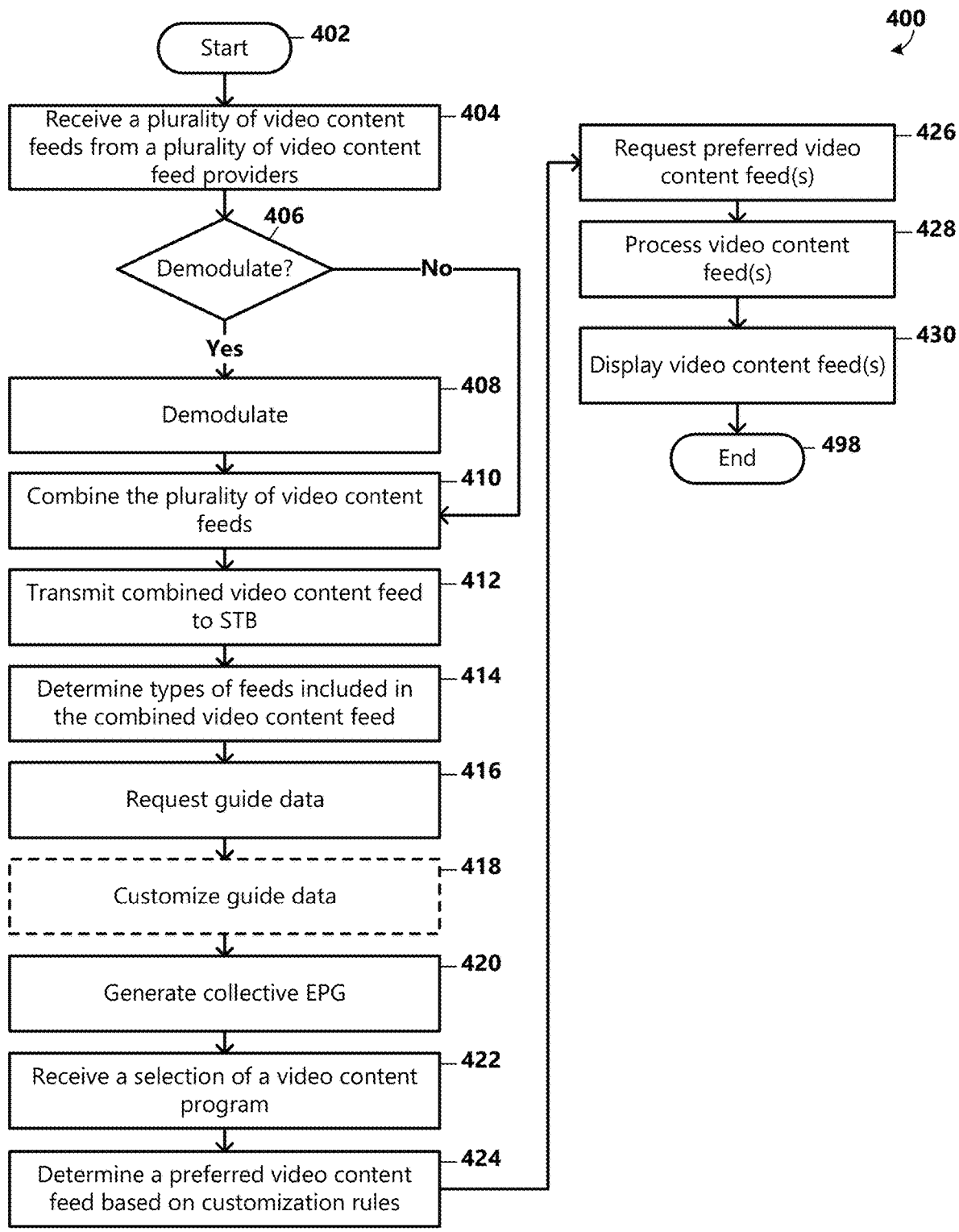
FIG. 4 is a flow diagram depicting more detailed stages of an example process for combining video content feeds and integrating services according to an embodiment.

FIG. 4 is a flow chart depicting general stages of an example process or method 400 for combining video content feeds and integrating services according to an embodiment. The method 400 starts at OPERATION 402 and proceeds to OPERATION 404, where a plurality of video content broadcast feeds 210 from a plurality of video content feed providers 102 are received. For example, the method 400 may use the multiplexer 202 to receive the various video content broadcast feeds 210 via various transmission networks 104.

At DECISION OPERATION 406, a determination may be made as to whether to demodulate a particular video content broadcast feed 210. For example, the determination may be made based on the broadcast feed 210 type. When a determination is made to demodulate a video content broadcast feed 210, at OPERATION 408, the feed may be passed to the demodulator 206 to extract video content data signals from carrier signals.

At OPERATION 410, demodulated video content broadcast feeds 210 and other feeds that may not need to be demodulated may be combined. For example, the method 400 may use the combiner 208 to combine the video content data signals to generate a combined video content feed 212.

At OPERATION 412, the combined video content feed 212 may be transmitted to the customer premises STB 204. For example, the combined video content feed 212 may be passed to the STB 204 via a coaxial cable 214.

At OPERATION 414, a determination may be made as to the types of video content broadcast feeds 210 that are included in the combined video content feed 212. For example, the method 400 may use the feed identifier 216 to make the determination. The determination may be based on information provided by the multiplexer 202 about the included video content broadcast feeds 210, from the cloud (e.g., server 116), frequency bands used, etc.

At OPERATION 416, a request may be made to obtain guide data and metadata from one or more data source servers 116. For example, the programming guide data may comprise information about the video content channels included in the video content broadcast feeds 210, such as channel numbering, frequencies of the channels, and associated metadata.

At OPTIONAL OPERATION 418, one or more customization rules 224 may be applied as part of selecting content for inclusion or preferential/prominent display in the EPG 302 and/or as part of assigning virtual channel numbers 304 to particular channel frequencies.

At OPERATION 420, a collective EPG 302 may be generated that includes scheduling information of each of the video content channels provided by the plurality of video content feed providers 102, and may further include information (e.g., descriptions, ratings) about the various programs 308 included in the lineups/schedules. According to an aspect, the EPG 302 may further include a recommendations menu comprising a listing of recommended channels or video programs included in the plurality of video content feeds 210 based on specified and/or determined user preferences. According to another aspect, the EPG 302 may further include a favorites menu comprising a listing of favorite channels or video programs included in the plurality of video content feeds 210 based on user selections and/or specified and/or determined user preferences. According to another aspect, the EPG 302 may further include a recordings menu 310 comprising a collective listing of recorded programs 312, wherein the recorded content may be provided by more than one of the plurality of video content feed providers 102.

At OPERATION 422, a selection of a video content program 308 may be received. For example, the user may select a video content program 308 listed in the EPG 302 to view.

At OPERATION 424, a determination may be made as to a preferred video content feed 210 corresponding to the selected video content program 308 based one or more customization rules 224. That is, based on user-specified preferences, user preferences determined based on user viewing behaviors, and/or business rules, the method 400 may use the customization engine 222 to select one particular video content broadcast feed 210 over another feed. For example, the determination/selection may be based on quality of service, additional services provided with a particular feed, etc. According to an aspect, a preferred video content feed 210 may be comprised of more than one feed. As an example, a video portion of one video content feed 210 and an audio portion of another video content feed 210 may be preferably selected for playback of a particular video content program 308.

At OPERATION 426, a request for the video content broadcast feed(s) 210 corresponding to the preferred feeds determined by the customization engine 222 may be sent to the multiplexer 202.

At OPERATION 428, the multiplexer 202 may pass the requested video content broadcast feed(s) 210 to the STB 204, where the one or more feeds may be processed for display and audible play. For example, the STB 204 may decode video content broadcast feed(s) 210 and tune accordingly based on the delivery mechanism of the feed(s).

At OPERATION 430, the video content program 308 may be displayed on the display device 108 and played via a speaker. The method 400 ends at OPERATION 498.

Figure 5:
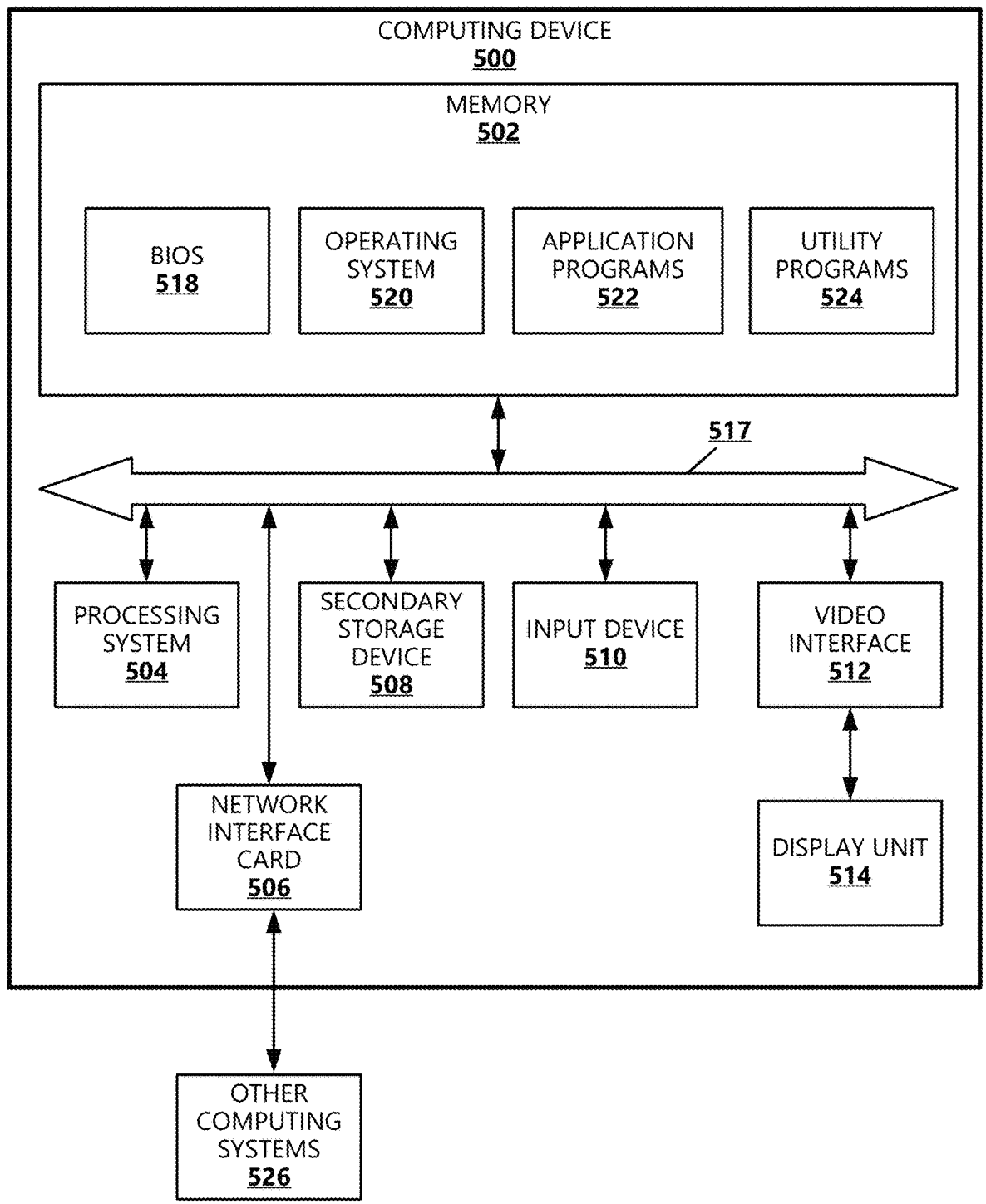
FIG. 5 is a block diagram illustrating example physical components of a computing device or system with which embodiments may be practiced.

FIG. 5 is a block diagram illustrating example physical components of a computing device or system 500 (e.g., system 110) with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface card 506 (wired and/or wireless), a secondary storage device 508, an input device 510, a video interface 512, a display unit 514, and a communication medium 517. In other embodiments, the computing device 500 may be implemented using more or fewer hardware components (e.g., a video interface, a display unit, or an input device) or in combination with other types of computer systems 526 and program modules.

The memory 502 includes one or more computer-readable storage media capable of storing data and/or computer-executable instructions. Memory 502 may store the computer-executable instructions that, when executed by a processor or processing unit of the processing system 504, cause operations, such as the operations described above with respect to FIG. 4) to combine video content feeds and integrate services. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units (e.g., one or more processors), which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 517 facilitates communication among the hardware components of the computing device 500. In different embodiments, the communications medium 517 facilitates communication among different components of the computing device 500. For instance, in the example of FIG. 5, the communications medium 517 facilitates communication among the memory 502, the processing system 504, the network interface card 506, the secondary storage device 508, the input device 510, and the video interface 512. In different embodiments, the communications medium 517 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
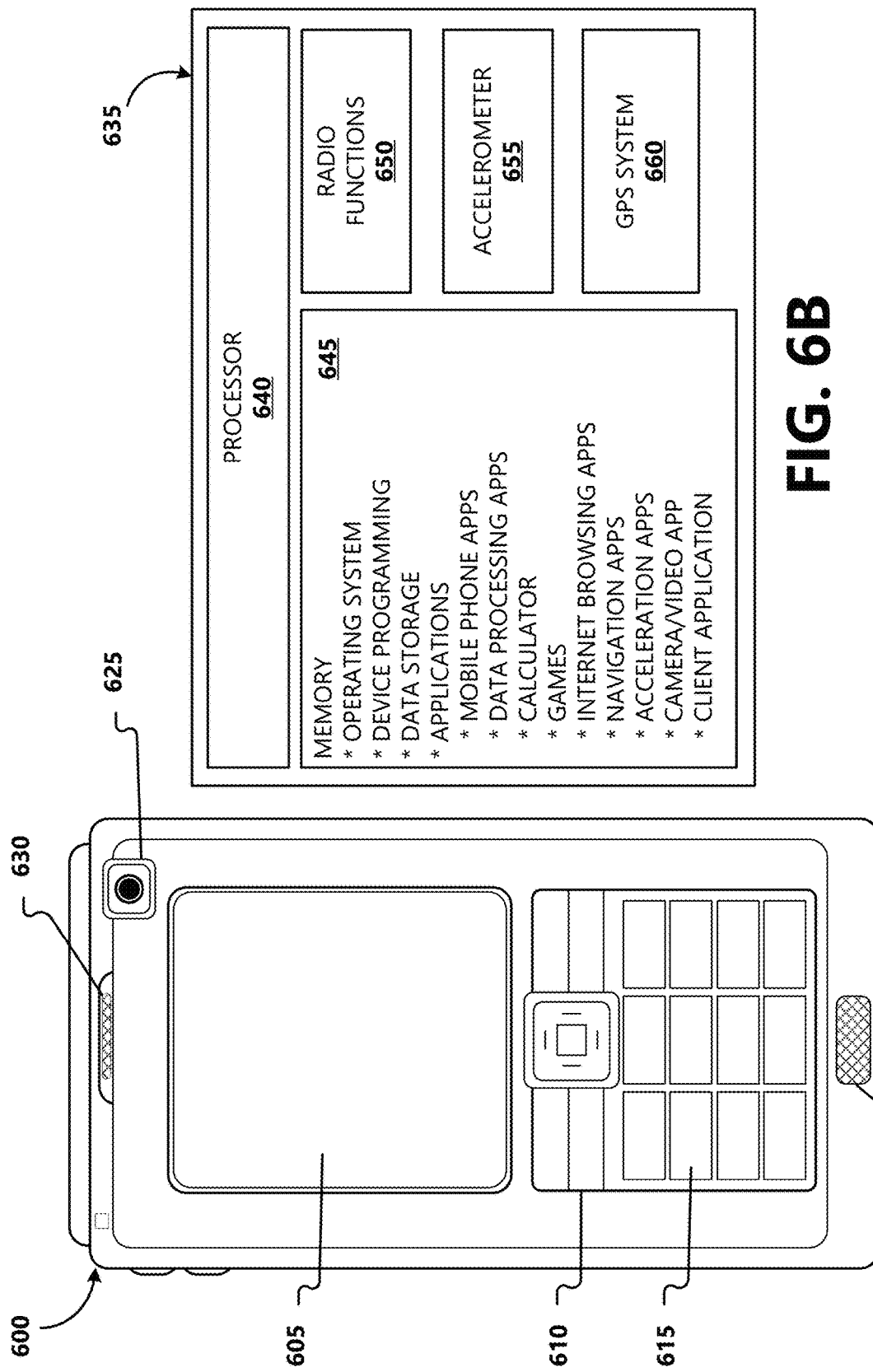
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other client device with which aspects can be practiced. The mobile computing device 600 is illustrative of any suitable device operative to send, receive and process wireless communications. Referring now to FIG. 6A, a display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
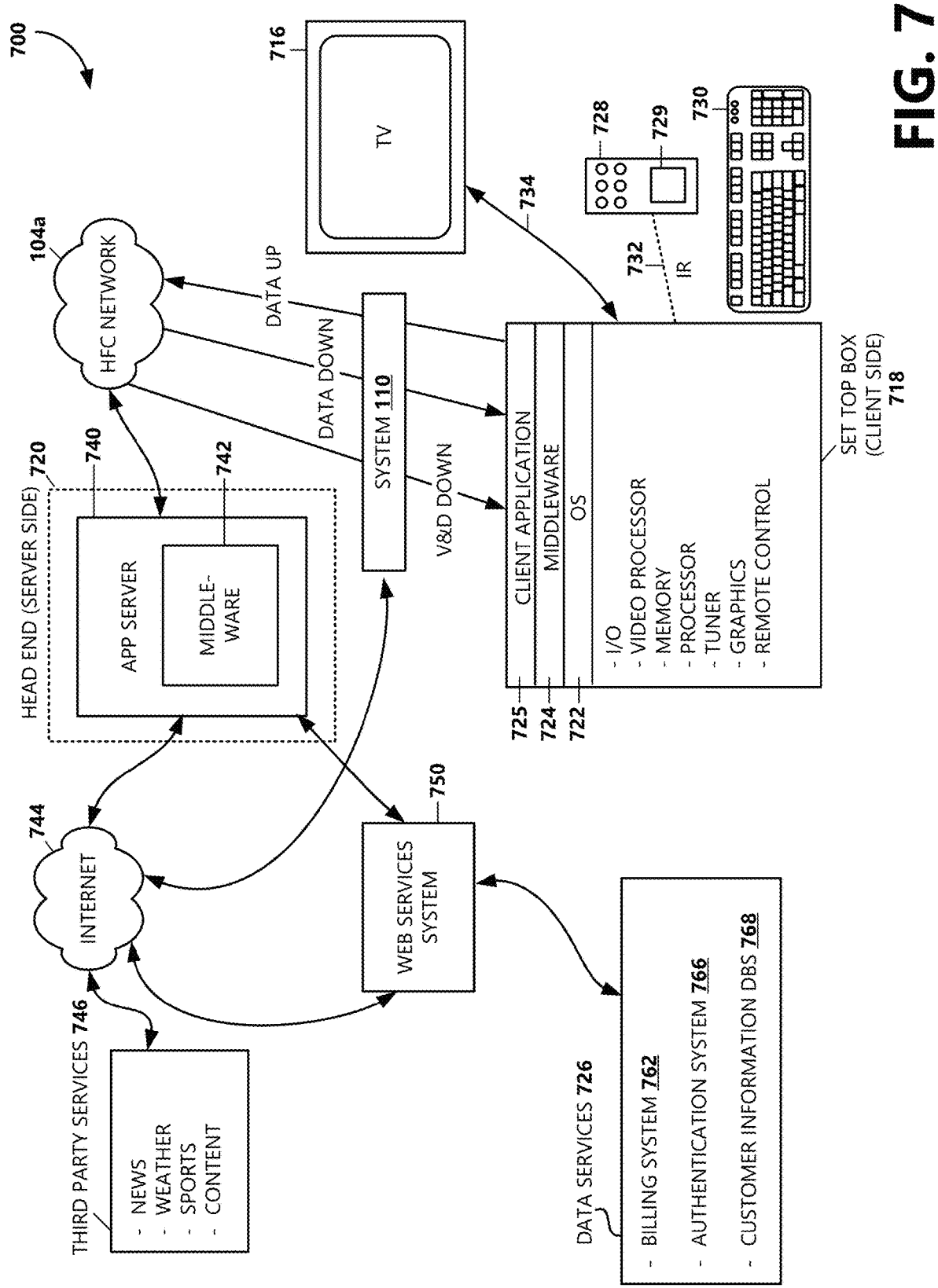
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. According to aspects, one of the plurality of video content feed providers 102 may operate in the form of a CATV 700 as illustrated and described in FIG. 7. As should be appreciated, a CATV services system 700 is but one of various types of systems that can be utilized for providing an operating environment for providing supplemental content functionality described herein. Referring now to FIG. 7, digital and analog video programming, information content and interactive television services are provided via a HFC network 104*a* to a television set 716 for consumption by a cable television/services system customer. As is known to those skilled in the art, HFC networks 104*a* combine both fiber optic cable lines and coaxial cable lines. Typically, fiber optic cable lines run from the cable head end 720 to neighborhoods of subscribers. Coaxial cable lines run from the optical fiber feeders to each customer or subscriber.

The CATV system 700 is in the form of a distributed client-server computing system for providing video and data flow across the HFC network 104*a* between server-side services providers (e.g., cable television/services providers), such as video content feed provider 102*a*, via a server-side head end 720 and a client-side customer via a set-top box (STB) 204 functionally connected to a customer receiving device, such as the television set 716. The functionality of the HFC network 104*a* allows for efficient bidirectional data flow between the set-top box 204 and an application server 740 of the server-side head end 720. As is understood by those skilled in the art, modern CATV systems 700 can provide a variety of services across the HFC network 104*a* including traditional digital and analog video programming, telephone services, high speed Internet access, video-on-demand, and services.

On the client side of the CATV system 700, digital and analog video programming and digital and analog data are provided to the customer television set 716 via the STB 204. Interactive television services that allow a customer to input data to the CATV system 700 likewise are provided by the STB 204. As illustrated in FIG. 7, the STB 204 is a multipurpose computing device having a computer processor, memory, and an input/output mechanism. The input/output mechanism receives input from server-side processes via the HFC network 104*a* and from customers via input devices such as a remote control device 728, keyboard 730, or other computing device, such as a tablet/slate computer, smart phone, etc. The remote control device 728 and the keyboard 730 can communicate with the STB 204 via a suitable communication transport such as the infrared connection 732. The remote control device 728 can include a biometric input module 729. The STB 204 also includes a video processor for processing and providing digital and analog video signaling to the television set 716 via a cable communication transport 734. A multi-channel tuner is provided for processing video and data to and from the STB 204 and the server-side head end 720, described below.

The STB 204 also includes an operating system 722 for directing the functions of the STB 204 in conjunction with a variety of client applications 725. For example, if a client application 725 requires a news flash from a third-party news source to be displayed on the television 716, the operating system 722 can cause the graphics functionality and video processor of the STB 204, for example, to output the news flash to the television 716 at the direction of the client application 725 responsible for displaying news items.

Because a variety of different operating systems 722 can be utilized by a variety of different brands and types of set-top boxes 204, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 204. The middleware layer 742 of the server-side application server and the middleware layer 724 of the client-side STB 204 can format data passed between the client side and server side according to the Extensible Markup Language (XML).

According to one aspect, the STB 204 passes digital and analog video and data signaling to the television 716 via a one-way communication transport 734. According to other aspects, two-way communication transports can be utilized, for example, via high definition multimedia (HDMI) ports. The STB 204 can receive video and data from the server side of the CATV system 700 via the HFC network 104a through a video/data downlink and data via a data downlink. According to an aspect, at least a portion of the integrated video feed system 110 (e.g., the multiplexer 202) may be operatively positioned between the HFC network 104a and the STB 204. The STB 204 can transmit data from the client side of the CATV system 700 to the server side of the CATV system 700 via the HFC network 104a via one data uplink. The video/data downlink is an "in band" downlink that allows for digital and analog video and data signaling from the server side of the CATV system 700 through the HFC network 104a to the STB 204 for use by the STB 204 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 104a and the set-top box 204 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 204 and the server-side application server 740 is typically passed through the "out of band" data links. Alternatively, an "in band" data carousel can be positioned in an "in band" channel into which a data feed can be processed from the application server 740 through the HFC network 104a to the STB 204. Operation of data transport between components of the CATV system 700, described with reference to FIG. 7, is well known to those skilled in the art.

Referring still to FIG. 7, the head end 720 of the CATV system 700 is positioned on the server side of the CATV system and includes hardware and software systems responsible for originating and managing content for distributing through the HFC network 104a to client-side STBs 204 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 204 via the HFC network 104a. As described above, the application server 740 includes a middleware layer 742 for processing and preparing data from the head end 720 of the CATV system 700 for receipt and use by the client-side STB 204. For example, the application server 740 via the middleware layer 742 can obtain supplemental content from third-party services 746 via the Internet 744 for transmitting to a customer through the HFC network 104a, the STB 204, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 204. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 204 through the HFC network 104a where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 104a and the STB 204.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt. An authentication system 766 can include information such as secure user names, subscriber profiles, subscriber IDs, and passwords utilized by customers for access to network services. A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer. The web services system 750 serves as an abstraction layer between the various data services systems and the application server 740.

That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing a combined video content feed, the system comprising:
    a multiplexer located at a customer premises comprising:
       a plurality of input pins to receive a plurality of video content feeds, the received plurality of video content feeds comprising at least two different video content feed types;
       a demodulator to demodulate one or more of the received plurality of video content feeds according to the feed type of each video content feed;
       a combiner to combine the demodulated plurality of video content feeds into a combined video content feed; and
       an output pin to output the combined video content feed; and
    a set-top box (STB) coupled to the output pin of the multiplexer, wherein the STB is located at the customer premises, and wherein the STB is configured to:
       receive, via the output pin of the multiplexer, the combined video content feed;
       identify each of the plurality of video content feeds within the combined video content feed;
       request guide data for each of the identified plurality of video content feeds from one or more data source servers;
       receive the requested guide data;
       combine the received guide data into an aggregated electronic programming guide;
       responsive to receiving a selection of a channel associated with a video content program via the aggregated electronic programming guide, request a video content feed corresponding to the channel;
       receive the requested video content feed corresponding to the channel;
       decode the received video content feed for a signal corresponding to the channel; and
       provide the signal to a display device for viewing the received video content feed;
       wherein the aggregated electronic programming guide comprises a user interface including a listing of favorite video content programs provided by at least two of the plurality of video content feed providers, wherein the favorite video content programs are determined based on user preferences associated with at least one of the plurality of video content feeds; and
       wherein the user interface further includes a listing of recorded video content programs provided by at least two of the plurality of video content feed providers.

2. The system of claim 1, wherein the plurality of video content feeds are encoded and transmitted according to various modulation techniques.

3. The system of claim 1, wherein, prior to the request for the video content feed corresponding to the channel, the system is further configured to:
    apply, via the STB, a customization rule to determine a preferred video content feed corresponding to the channel; and
    based on the customization rule, request the preferred video content feed.

4. The system of claim 3, wherein the customization rule is associated with a business rule to select a preferred video content feed based on at least one of:
    signal quality;
    signal strength;
    video resolution; and
    bandwidth allocation.

5. The system of claim 3, wherein the customization rule is associated with one of:
    a user-selected user preference; or
    a user preference determined based on user viewing behavior.

6. The system of claim 3, wherein the preferred video content feed comprises at least two video content feeds.

7. The system of claim 1, wherein the user interface includes a listing of video content programs included in the plurality of video content feeds provided by a plurality of video content feed providers.

8. The system of claim 7, wherein the user interface includes a listing of recommended video content programs provided by at least two of the plurality of video content feed providers, wherein the recommended video content programs are determined based on user preferences associated with at least one of the plurality of video content feeds.

9. The system of claim 8, wherein the STB is further configured to apply one or more business rules when determining favorite video content programs or recommended video content programs.

10. The system of claim 8, wherein the STB is further configured to apply one or more customization rules when determining favorite video content programs or recommended video content programs.

11. The system of claim 1, wherein the received video content feed type comprises:
    a cable television (CATV) quadrature amplitude modulation (QAM) channel;

an advanced television standards committee (ATSC) channel;

a satellite broadcast channels/signal;

a terrestrial television (ATSC) channel over the air (OTV) radio waves; or an internet protocol television (IPTV) channel.

12. A method of providing a combined video content feed from a multiplexer to a set-top box (STB), comprising:

coupling an output pin of the multiplexer with the STB, wherein the multiplexer includes:

a plurality of input pins to receive a plurality of video content feeds, the plurality of video content feeds comprising at least two different video content feed types;

a demodulator to demodulate one or more of the received plurality of video content feeds according to the feed type of each video content feed; and a combiner to combine the demodulated plurality of video content feeds into a combined video content feed;

receiving, via the output pin of the multiplexer, the combined video content feed;

identifying, via the STB, each of the plurality of video content feeds within the combined video content feed;

requesting, via the STB, guide data for each of the identified plurality of video content feeds from one or more data source servers;

receiving the requested guide data;

combining, via the STB, the received guide data into an aggregated electronic programming guide;

responsive to receiving a selection of a channel associated with a video content program via the aggregated electronic programming guide, requesting a video content feed corresponding to the channel;

receiving the requested video content feed corresponding to the channel;

decoding the received video content feed for a signal corresponding to the channel; and providing the signal to a display device for viewing the received video content feed, wherein combining the guide data into the aggregated electronic programming guide comprises providing a user interface including a listing of favorite video content programs provided by at least two of the plurality of video content feed providers, and wherein the favorite video content programs are determined based on user preferences associated with at least one of the plurality of video content feeds;

wherein the user interface further includes a listing of recorded video content programs provided by at least two of the plurality of video content feed providers.

13. The method of claim 12, wherein, prior to requesting the video content feed corresponding to the channel:

applying, via the STB, a customization rule to determine a preferred video content feed corresponding to the channel; and based on the customization rule, requesting the preferred video content feed.

14. The method of claim 12, wherein the user interface further includes a listing of video content programs included in the plurality of video content feeds provided by a plurality of video content feed providers.

15. The method of claim 12, wherein the user interface further includes a listing of recommended video content programs provided by at least two of the plurality of video content feed providers, and wherein the recommended video content programs are determined based on user preferences associated with at least one of the plurality of video content feeds.

16. The method of claim 15, further comprising:

applying one or more business rules when determining favorite video content programs or recommended video content programs.

17. The method of claim 12, wherein the received video content feed type comprises:

a cable television (CATV) quadrature amplitude modulation (QAM) channel;

an advanced television standards committee (ATSC) channel;

a satellite broadcast channels/signal;

a terrestrial television (ATSC) channel over the air (OTV) radio waves; or an internet protocol television (IPTV) channel.

18. A computer readable storage device that includes executable instructions which, when executed by a processor provide a combined video content feed, the instructions comprising:

using an output pin of a multiplexer coupled to a set-top-box (STB) to transmit video content to the STB, wherein the multiplexer includes:

a plurality of input pins to receive a plurality of video content feeds, the received plurality of video content feeds comprising at least two different video content feed types;

a demodulator to demodulate one or more of the received plurality of video content feeds according to the feed type of each video content feed; and a combiner to combine the demodulated plurality of video content feeds into a combined video content feed;

receiving, via the output pin of the multiplexer, the combined video content feed;

identifying, via the STB, each of the plurality of video content feeds within the combined video content feed;

requesting, via the STB, guide data for each of the identified plurality of video content feeds within the combined video content feed;

receiving the requested guide data;

combining, via the STB, the received guide data into an aggregated electronic programming guide;

responsive to receiving a selection of a channel associated with a video content program via the aggregated electronic programming guide, applying a customization rule to determine a preferred video content feed corresponding to the channel;

based on the determination, requesting, via the aggregated electronic programming guide, the preferred video content feed;

receiving the preferred video content feed;

decoding the received preferred video content feed for a signal corresponding to the channel;

providing the signal to a display device for viewing the received video content feed; and providing a user interface including a listing of favorite video content programs provided by at least two of the plurality of video content feed providers, and wherein the favorite video content programs are determined based on user preferences associated with at least one of the plurality of video content feeds, wherein the user interface further includes a listing of recorded video content programs provided by at least two of the plurality of video content feed providers.

19. The computer readable storage device of claim 18, wherein combining the guide data into the aggregated electronic programming guide comprises one or more of:
- providing a user interface including a listing of video content programs included in the plurality of video content feeds provided by a plurality of video content feed providers; and
- providing a user interface including a listing of recommended video content programs provided by at least two of the plurality of video content feed providers, and wherein the recommended video content programs are determined based on user preferences associated with at least one of the plurality of video content feeds.

20. The computer readable storage device of claim 19, wherein determining favorite video content programs or recommended video content programs comprises applying one or more business rules.

\* \* \* \* \*